(12) United States Patent
Huang

(10) Patent No.: US 9,194,503 B2
(45) Date of Patent: Nov. 24, 2015

(54) DRAINING DEVICE FOR MACHINE TOOL

(71) Applicant: Yu Yu Huang, Taichung (TW)

(72) Inventor: Yu Yu Huang, Taichung (TW)

( * ) Notice: Subject to any disclaimer, the term of this patent is extended or adjusted under 35 U.S.C. 154(b) by 271 days.

(21) Appl. No.: 14/024,650

(22) Filed: Sep. 12, 2013

(65) Prior Publication Data

US 2015/0069281 A1 Mar. 12, 2015

(51) Int. Cl.
*F16K 5/20* (2006.01)

(52) U.S. Cl.
CPC ........................................ *F16K 5/201* (2013.01)

(58) Field of Classification Search
CPC ............... F16K 5/20; F16K 5/06; F16K 5/14; F16K 27/06; F16K 27/067; F16K 3/202; F16K 3/204; F01M 2011/0416
USPC ................................ 251/216, 309, 316, 315.1
See application file for complete search history.

(56) References Cited

U.S. PATENT DOCUMENTS 3,234,958 A * 2/1966 Butters .......................... 137/328
4,304,252 A * 12/1981 Stanton ......................... 137/240

\* cited by examiner

*Primary Examiner* — Marina Tietjen

(57) ABSTRACT

A draining device for a machine tool, which is assembled in a drain hole of a base of the machine tool, includes a ball, an outer shell, a sealing member and a flat head screw. The ball has a through hole defined therein. The outer shell has a receiving hole and the ball is received in the receiving hole of the outer shell. The sealing member has a guiding hole defined therethrough. The sealing member is inserted in the receiving hole of the outer shell and abutting against the ball with one end. The flat head screw is screwed in the base and a head portion of the flat head screw presses a top end of the outer shell. Under this arrangement, the ball is rotatable relative to the outer shell so as to adjust an angle of the through hole of the ball.

8 Claims, 12 Drawing Sheets

DRAINING DEVICE FOR MACHINE TOOL

BACKGROUND OF THE INVENTION

1. Field of the Invention

The present invention relates to a draining device, and more particularly to a draining device for a machine tool that allows a user to adjust an angle of a through hole of a ball easily.

2. Description of Related Art

Lathes are used in a wide range of applications, and a broad range of materials. The lathes are provided to perform various operations, such as cutting, sanding, knurling or drilling. In the manufacturing process, when the workpiece is operated at high speeds, the frictional heat between the workpiece and the object is generated immediately and leads wear of the workpiece or deformation of the object. In order to reduce the frictional heat, processing liquids such as water or cutting fluid are generally used in the manufacturing process between the workpiece and the object so as to reduce frictional heat and increase lubricity between the workpiece and the object.

Referring to FIGS. 11-12, a conventional draining device for a machine tool which is assembled in a drain hole 101a of a base 10a comprises a ball 1a, a flat head screw 2a and a washer 3a. The drain hole 101a has a shoulder portion 102a defined in an inner periphery of the drain hole 101a at an opening portion. The washer 3a is placed in the drain hole 101a and abutted against the shoulder portion 102a. The ball 1a is received in the drain hole 101a above the washer 3a. Afterward the flat head screw 2a is screwed adjacent to the drain hole 101a so as to restrict the ball 1a within the drain hole 101a. Therefore, the ball 1a could be adjusted.

However, the conventional draining device for a machine tool has disadvantages as following:

1. The ball 1a is merely restricted by the flat head screw 2a so that the ball 1a will be lost easily as the ball 1a is rotated overly.
2. It is inconvenient for a user to adjust the ball 1a as the flat head screw 2a is tightened.
3. The washer 3a cannot achieve effective sealing effect while the ball 2a is rotated.

The present invention has arisen to mitigate and/or obviate the disadvantages of the conventional draining device.

SUMMARY OF THE INVENTION

The main objective of the present invention is to provide an improved draining device for a machine tool.

To achieve the objective, a draining device for a machine tool, which is to be assembled in a drain hole of a base of the machine tool, the draining device comprises a ball having a through hole defined therein, an outer shell having a receiving hole defined therethrough, the ball received in the receiving hole of the outer shell, a sealing member having a guiding hole defined therethrough, the guiding hole of the sealing member communicating with the through hole of the ball and the receiving hole of the outer shell, the sealing member inserted in the receiving hole of the outer shell and abutting against the ball with one end, a flat head screw screwed in a lock hole of the base and having a head portion pressing against a top end of the outer shell. Wherein a diameter of the receiving hole of the outer shell is slightly greater than or equal to a diameter of the ball; the outer shell has an arc surface defined in one end of the receiving hole opposite to the sealing member, the arc surface of the outer shell corresponding to an outer periphery of the ball; the sealing member has an arc edge defined at a wall of the guiding hole of the sealing member and corresponding to the outer periphery of the ball; the sealing member has an annular flange defined at one end thereof and the base has a step hole defined at an opening portion of the drain hole, the annular flange of the sealing member abuts against a shoulder portion of a step hole of the base; and one end of the ball is projected from the step hole of the base. Furthermore, the draining device further comprises a screw member and a thread defined in an inner periphery of the through hole of the ball. The screw member is screwed into the through hole of the ball via the thread to seal the through hole.

Under this arrangement, the ball is rotatable relative to the outer shell so as to adjust an angle of the through hole of the ball.

Another draining device for a machine tool, which is to be assembled in a drain hole of a base of the machine tool, the draining device comprises a ball having a through hole defined therein, an outer shell having a receiving hole defined therethrough, the ball received in the receiving hole of the outer shell, the outer shell having an external thread defined at an outer periphery thereof and corresponding to an internal thread of the drain hole of the base, a sealing member has a guiding hole defined therethrough, the sealing member communicating with the through hole of the ball and the receiving hole of the outer shell, the sealing member inserted in the receiving hole of the outer shell and abutting against the ball with one end. Wherein a diameter of the receiving hole of the outer shell is slightly greater than or equal to a diameter of the ball; the outer shell has an arc surface defined in one end of the receiving hole opposite to the sealing member, the arc surface of the outer shell corresponding to an outer periphery of the ball; the sealing member has an arc edge defined at a wall of the guiding hole of the sealing member and corresponding to the outer periphery of the ball; the sealing member has an annular flange defined at one end thereof and the base has a step hole defined at an opening portion of the drain hole, the annular flange of the sealing member abuts against a shoulder portion of a step hole of the base; and one end of the ball is projected from the step hole of the base. Furthermore, the draining device further comprises a screw member and a thread defined in an inner periphery of the through hole of the ball. The screw member is screwed into the through hole of the ball via the thread to seal the through hole.

Under this arrangement, the outer shell is screwed into the drain hole of the base and the ball is rotatable relative to the outer shell so as to adjust an angle of the through hole of the ball.

Further benefits and advantages of the present invention will become apparent after a careful reading of the detailed description with appropriate reference to the accompanying drawings.

DETAILED DESCRIPTION OF THE INVENTION

Figure 1:
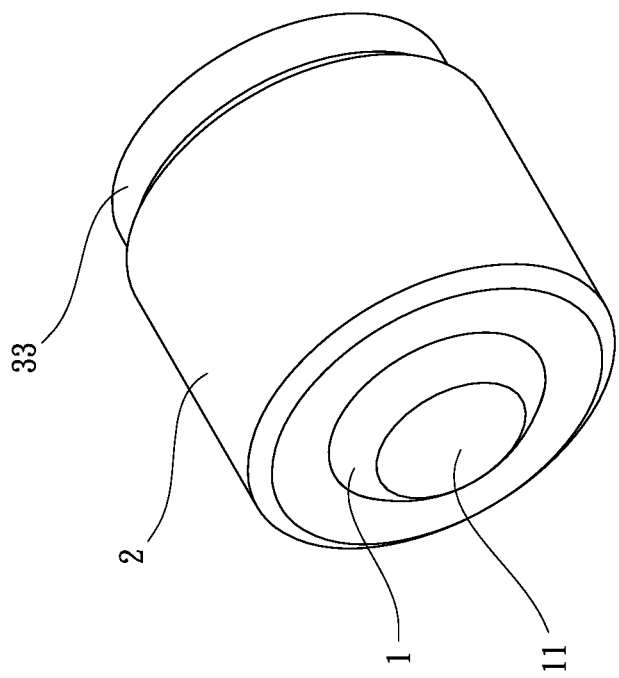
FIG. 1 is a perspective view of a draining device for machine tool in accordance with a first embodiment of the present invention.
Figure 2:
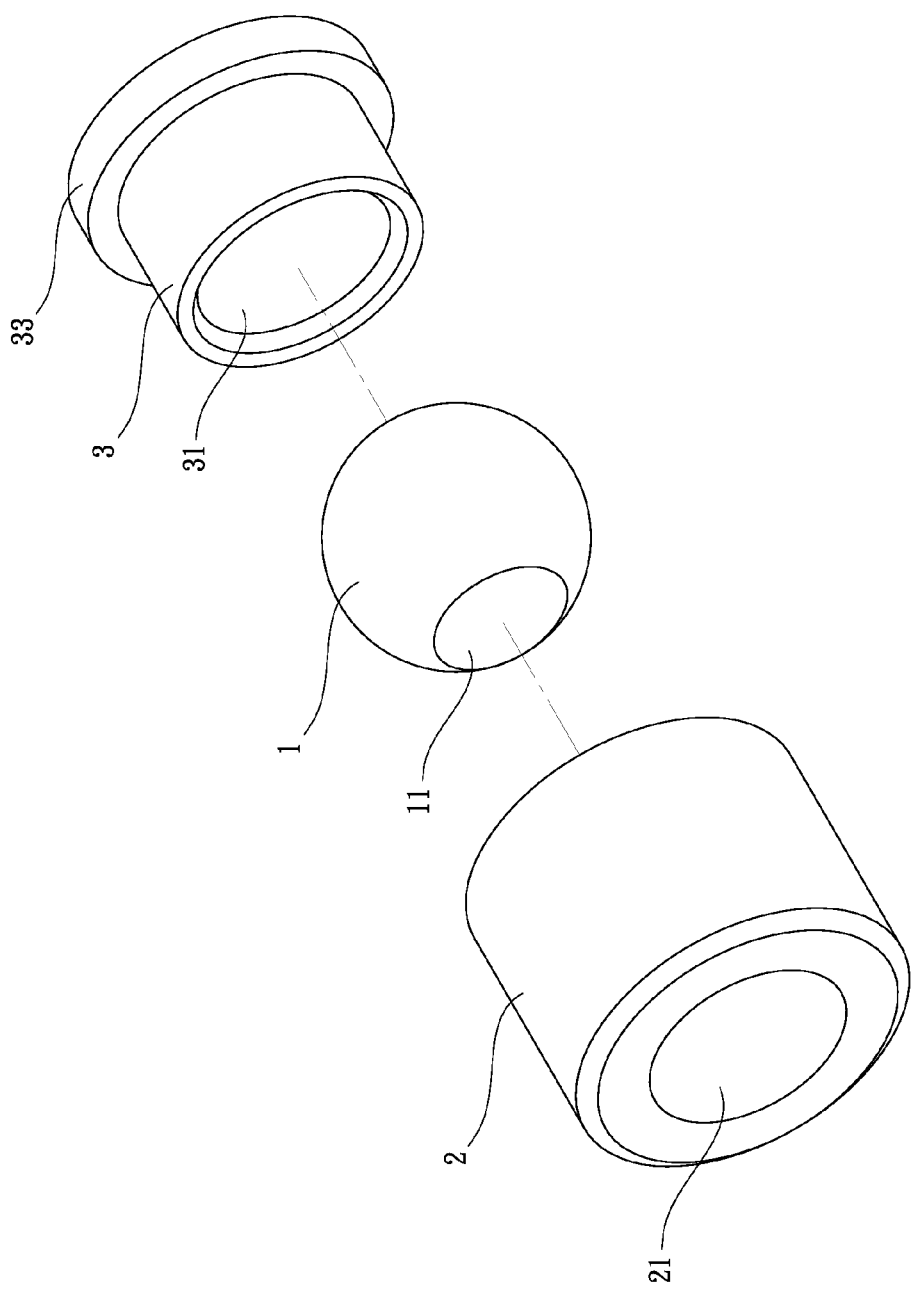
FIG. 2 is an exploded perspective view of the draining device for machine tool of FIG. 1.
Figure 3:
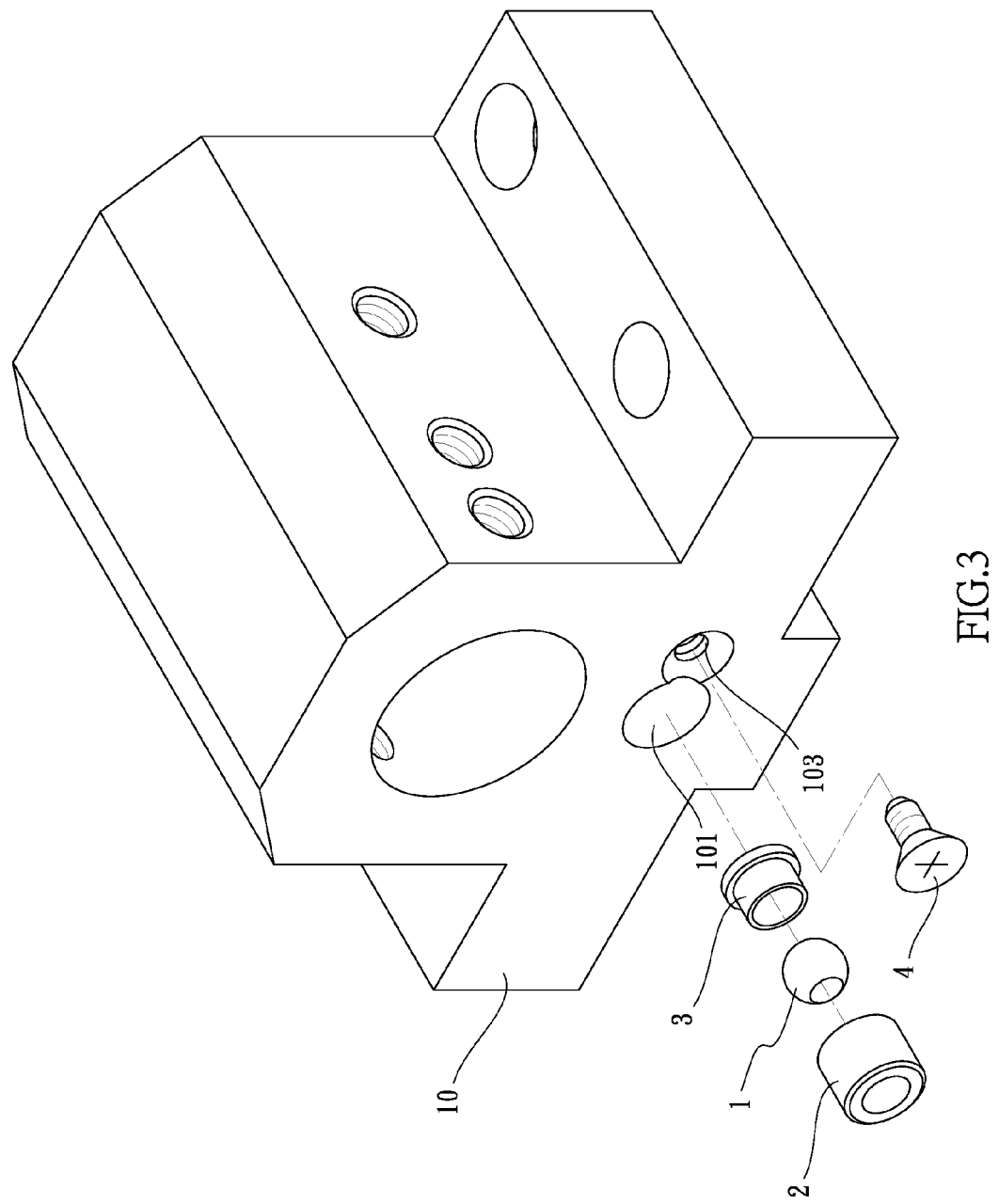
FIG. 3 is an exploded perspective view of the draining device for machine tool of FIG. 1 which is assembled in a base.
Figure 4:
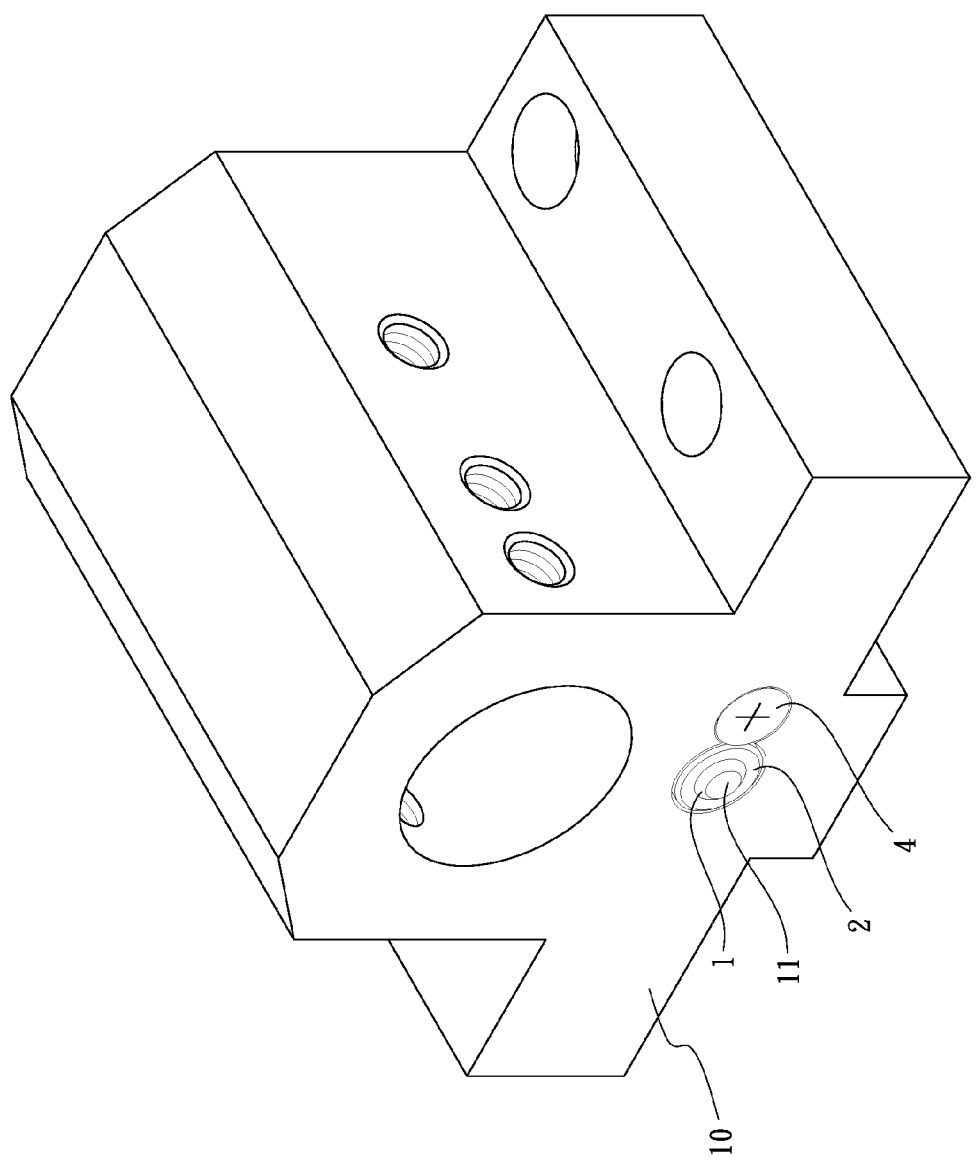
FIG. 4 is a perspective view of the draining device for machine tool of FIG. 1 which is assembled in the base.

Referring to FIGS. 1-5, a draining device for a machine tool in accordance with a first embodiment of the present invention which is assembled in a base 10 comprises a ball 1, an outer shell 2, a sealing member 3 and a flat head screw 4. The ball 1 has a through hole 11 defined therein. The outer shell 2 has a receiving hole 21 defined therethrough. The ball 1 is received in the receiving hole 21 of the outer shell 2. The sealing member 3 has a guiding hole 31 defined therethrough. The guiding hole 31 of sealing member 3 communicates with the through hole 11 of the ball 1 and the receiving hole 21 of the outer shell 2. The sealing member 3 is inserted in the receiving hole 21 of the outer shell 2 and abuts against the ball 1 with one end. The sealing member 3 is made of plastic or metal material such as copper. The flat head screw 4 is screwed in a lock hole 103 of the base 10 and a head portion of the flat head screw 4 presses against a top end of the outer shell 2.

Figure 5:
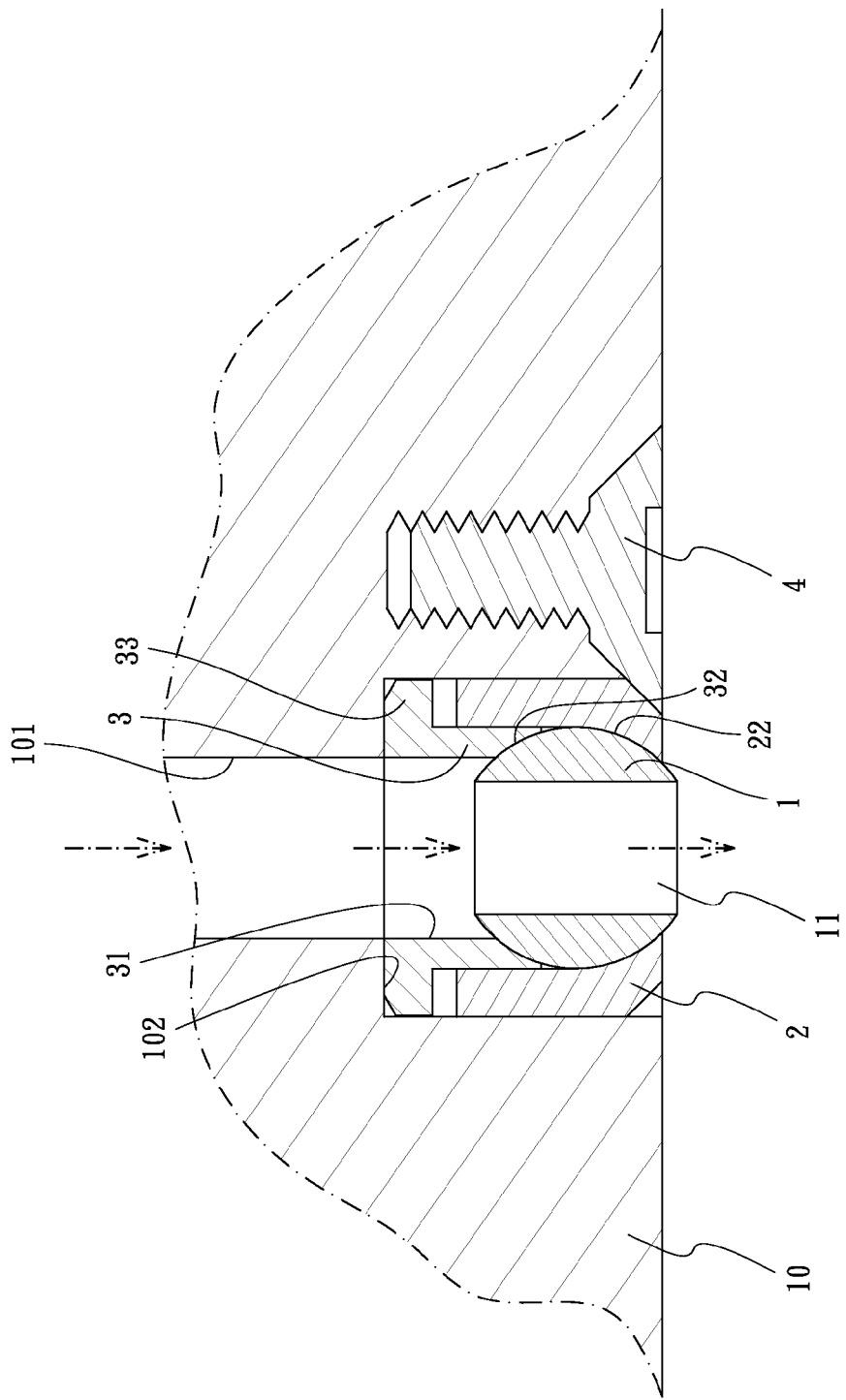
FIGS. 5-6 are partial cross-sectional views of FIG. 4, showing a ball could be adjusted.
Figure 6:
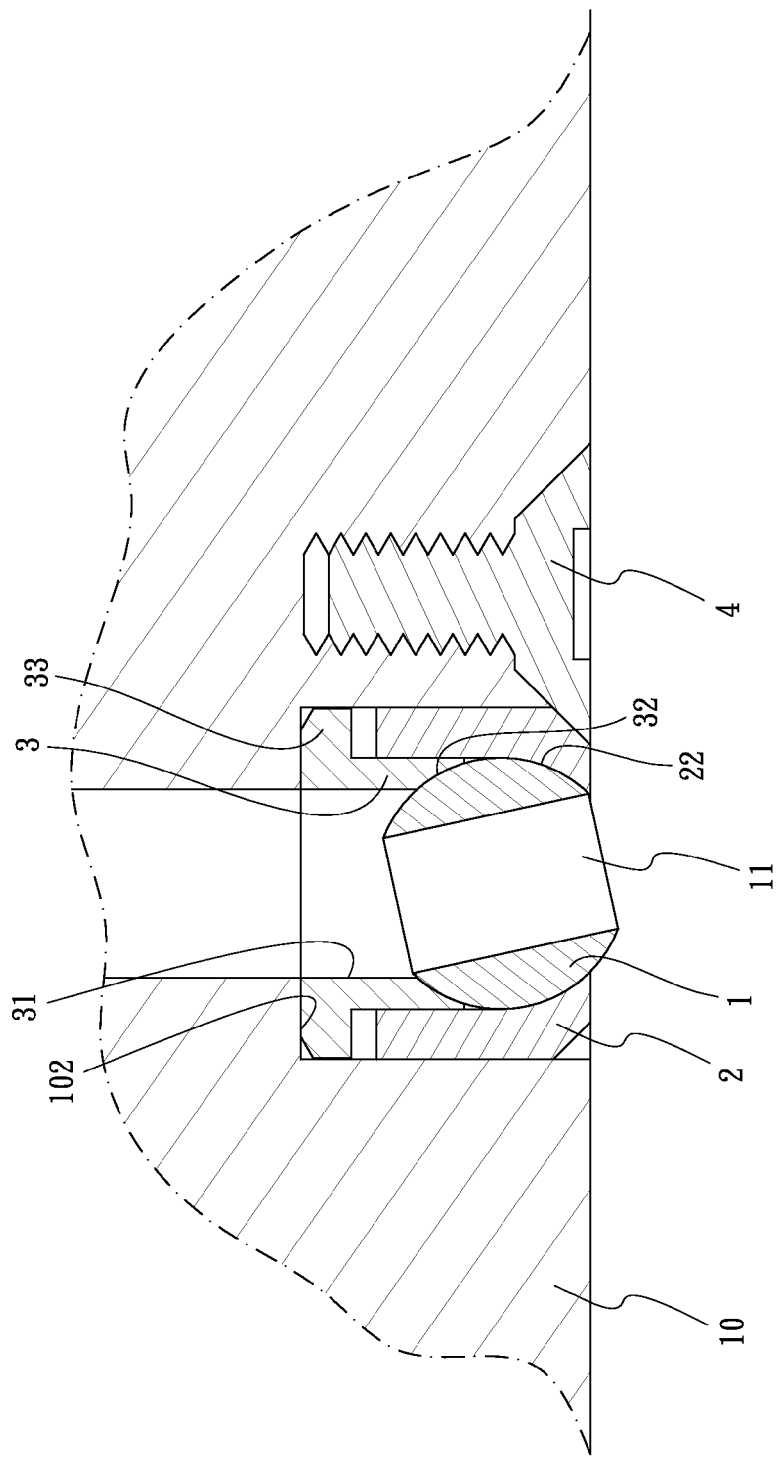

FIGS. 5-6 illustrates that the draining device is assembled in the base 10 of the machine tool. The base 10 has a drain hole 101 defined therein and a step hole 102 defined at an opening portion of the drain hole 101. The lock hole 103 of the base 10 is adjacent to the step hole 102. The sealing member 3 is received in the step hole 102 of the base 10 and abuts against a shoulder portion of the step hole 102. The outer shell 2 is disposed in the step hole 102 at opening end. The ball 1 is rotatably received between the outer shell 2 and the sealing member 3. When the flat head screw 4 is screwed into the lock hole 103 of the base 10, the head portion of the flat head screw 4 presses against the top end of the outer shell 2 so as to secure the outer shell 2 in the step hole 102 of the base 10. Therefore, the outer shell 2 and the sealing member 3 is secured in the step hole 102 of the base 10 by the flat head screw 4 and the ball 1 is positioned between the outer shell 2 and the sealing member 3.

Under this arrangement, the ball 1 could be rotatable in the receiving hole 21 of the outer shell 2 so as to adjust the position of the through hole 11 of the ball 1. Specifically, the outer shell 2 could be tightened by the flat head screw 4 so as to lead the outer shell 2 to push the ball 1 to force the sealing member 3 toward the shoulder portion of the step hole 102 of the base 10. When the through hole 11 of the ball 1 is adjusted to a preferred angle, the ball 1 could be fixed in the receiving hole 21 of the outer shell 2 by tightening the flat head screw 4 so as to prevent the angle of the through hole 11 of the ball 1 from being shifted.

More specifically, a diameter of the receiving hole 21 of the outer shell 2 is slightly greater than or equal to a diameter of the ball 1 so that the ball 1 could be placed into the receiving hole 21 smoothly. The outer shell 2 has an arc surface 22 defined in one end of the receiving hole 21 opposite to the sealing member 3. The arc surface 22 of the outer shell 2 corresponds to an outer periphery of the ball 1. Therefore, the arc surface 22 of the outer shell 2 abuts against the ball 1 so as to secure the ball 1 in the receiving hole 21 of the outer shell 2.

Furthermore, the sealing member 3 has an arc edge 32 defined at a wall of the guiding hole 31 of the sealing member 3 and corresponding to the outer periphery of the ball 1. Referring to FIG. 5, the arc edge 32 of the sealing member 3 and the arc surface 22 of the outer shell 2 are opposite to each other. Therefore, when the outer shell 2 presses the ball 1 and further presses sealing member 3, the outer shell 2 and the sealing member 3 both abut firmly against the outer periphery of the ball 1. Specifically, the sealing member 3 has an annular flange 33 defined at one end thereof. The annular flange 33 of the sealing member 3 is configured to press firmly against the shoulder portion of the step hole 102 of the base 10. In addition, one end of the ball 1 is projected from the drain hole 101, so that the angle of the through hole 11 of the ball 1 could be adjusted easily, as shown in FIGS. 5-6.

Figure 7:
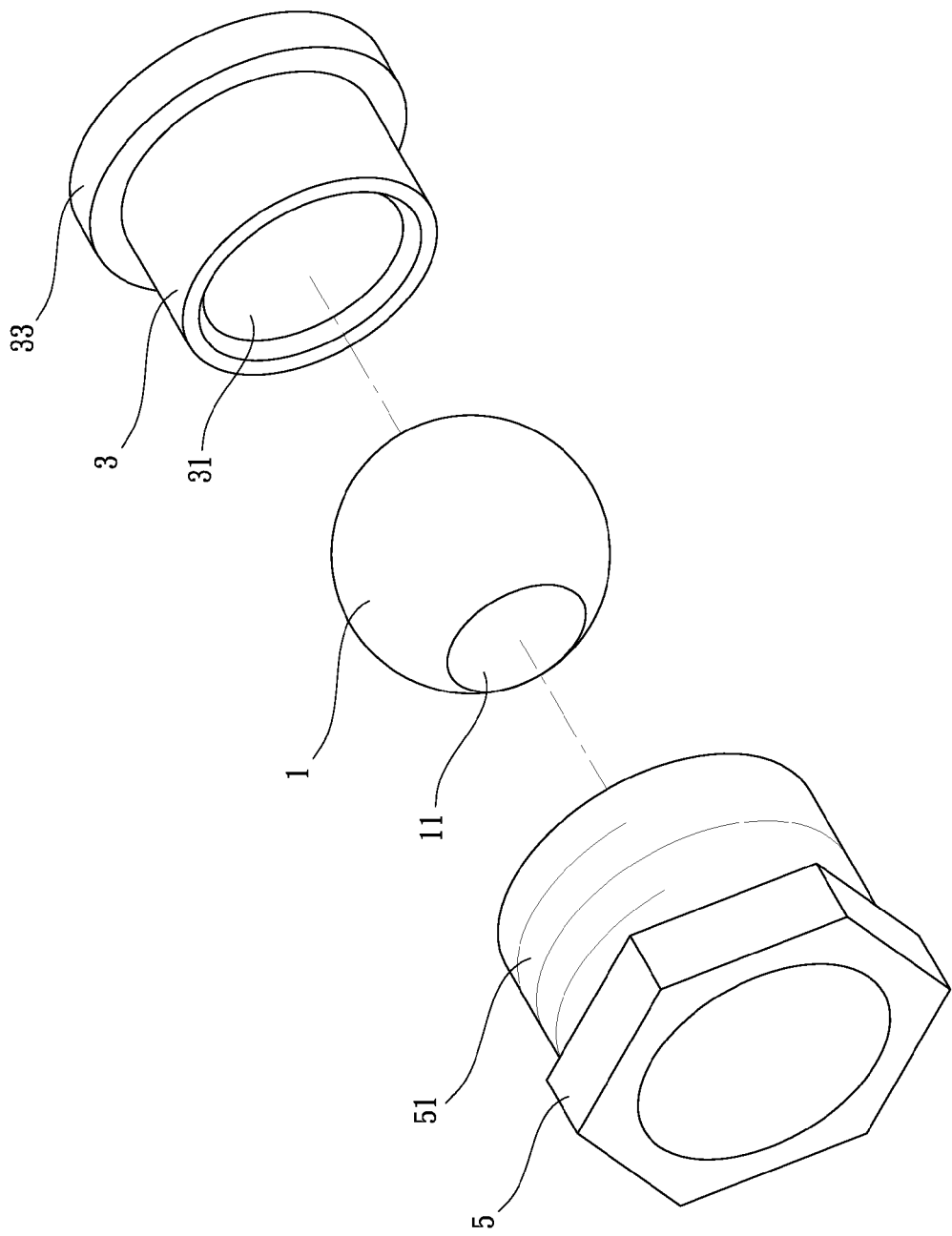
FIG. 7 is an exploded perspective view of a draining device for machine tool in accordance with a second embodiment of the present invention.
Figure 8:
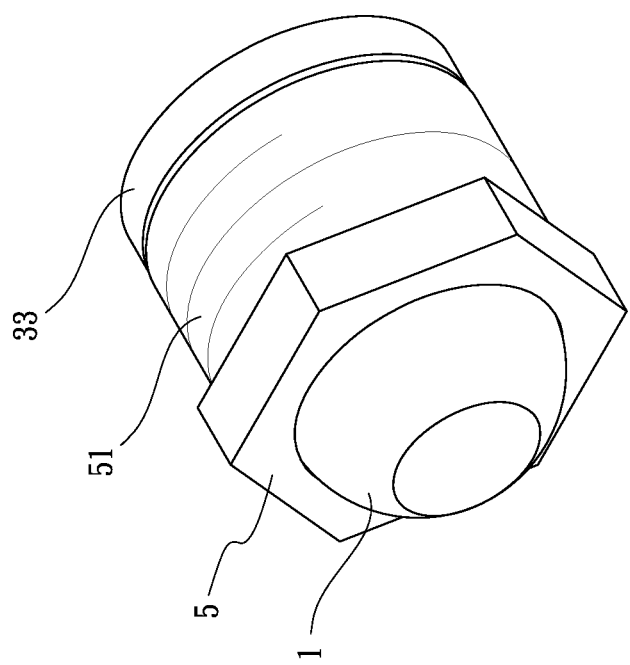
FIG. 8 is an exploded perspective view of the draining device for machine tool of FIG. 7.
Figure 9:
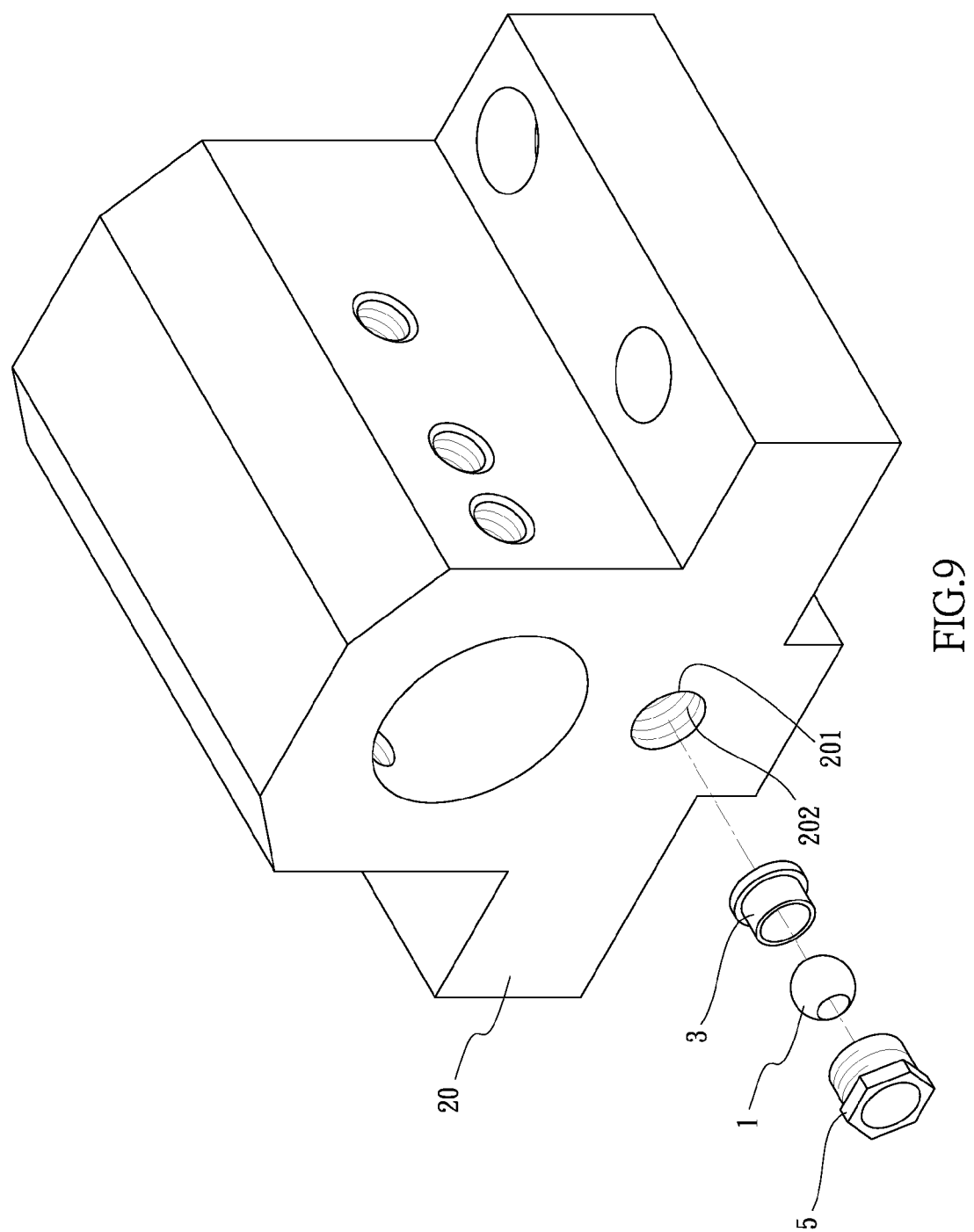
FIG. 9 is an exploded perspective view of the draining device for machine tool of FIG. 8 which is assembled in a base.

Referring to FIGS. 7-9, there is shown a second embodiment of the present invention. The second embodiment is similar to the first embodiment, except that the outer shell 5 has an external thread 51 defined at an outer periphery thereof. The second embodiment is applied to a base 20 without additional lock hole. The drain hole 201 of the base 20 has an internal thread 202 corresponding to the external thread 51 of the outer shell 5.

The differences between the first embodiment and the second embodiment are described as following. In the first embodiment, the outer shell 2 is pressed by the flat head screw 4 so as to fix the outer shell 2 in the drain hole 101 of the base 10. In the second embodiment, the outer shell 5 could be screwed into the drain hole 201 of the base 20 directly by engagement of the external thread 51 of the outer shell 5 and the internal thread 202 of the drain hole 201 of the base 20, so that the second embodiment of the present invention does not require additional component to secure the outer shell 5.

In the second embodiment, the through hole 11 of the ball 1 could be adjusted to a preferred angle and secured by tightening the outer shell 5. When the outer shell 5 is tightened, the ball 1 is pushed by the outer shell 5 to force the sealing member 3 toward the shoulder portion of the step hole 102 of the base 20.

Figure 10:
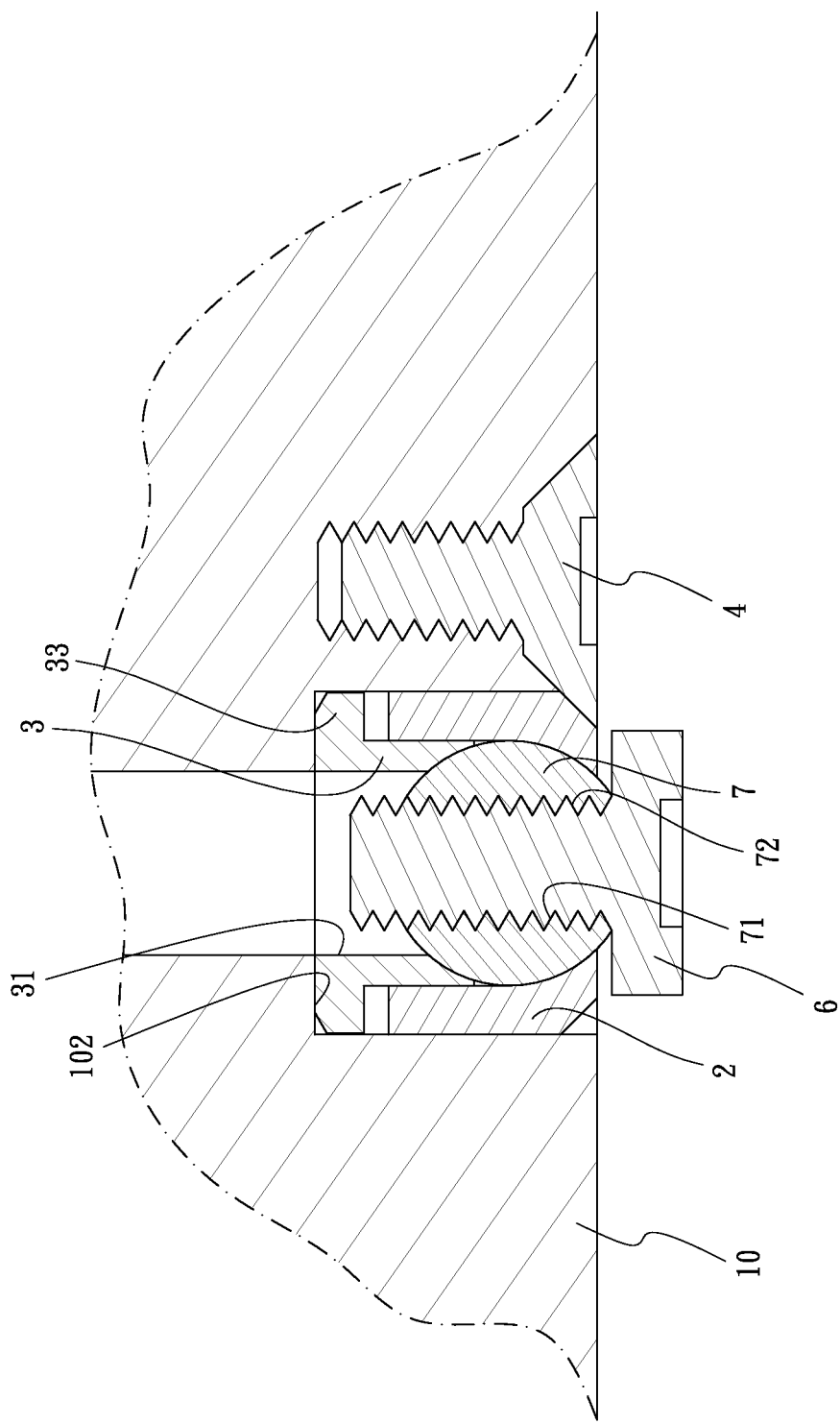
FIG. 10 illustrates a screw member screwed in a through hole of a ball.
Figure 11:
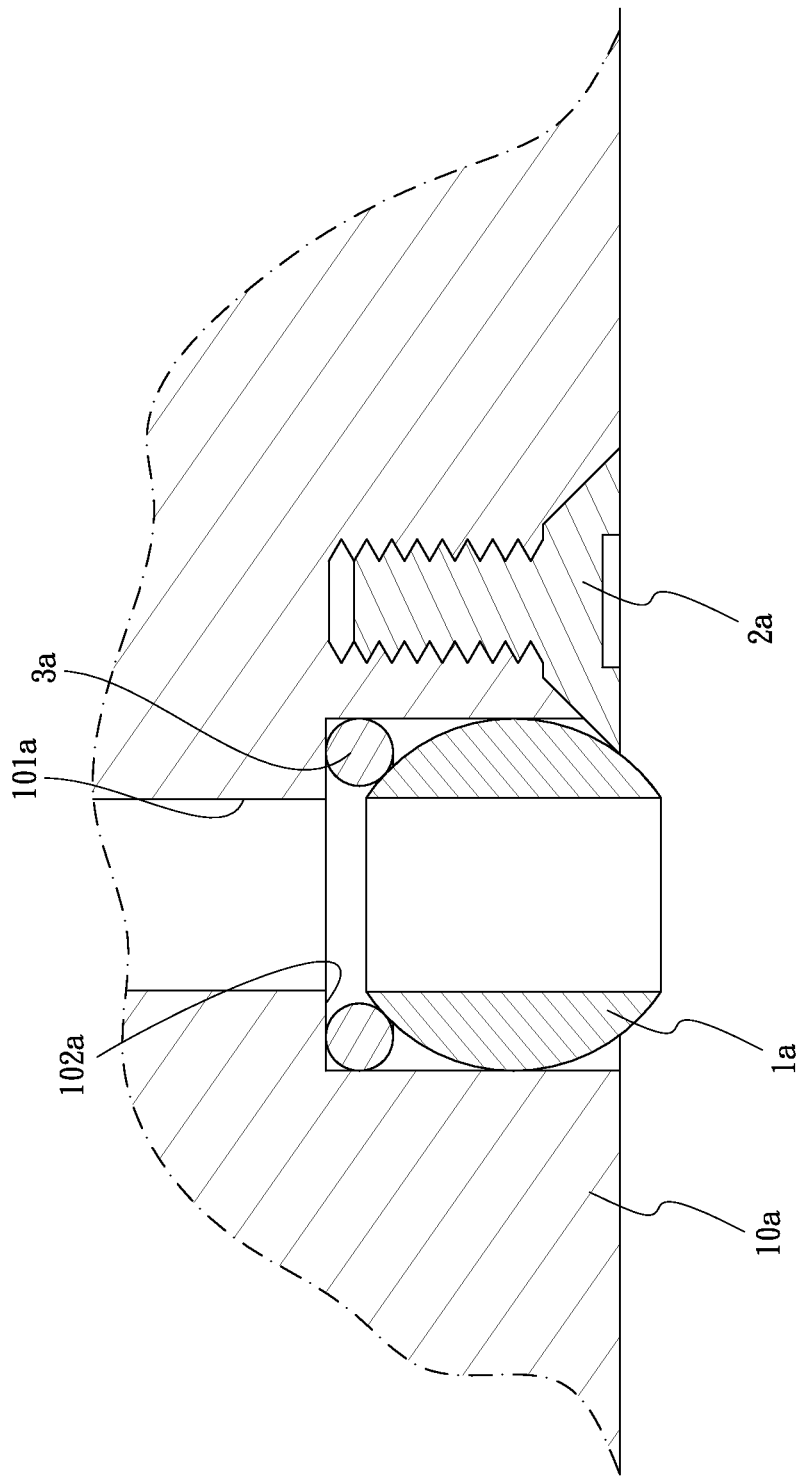
FIGS. 11-12 are cross-sectional views of a conventional draining device for a machine tool while being in operation.
Figure 12:
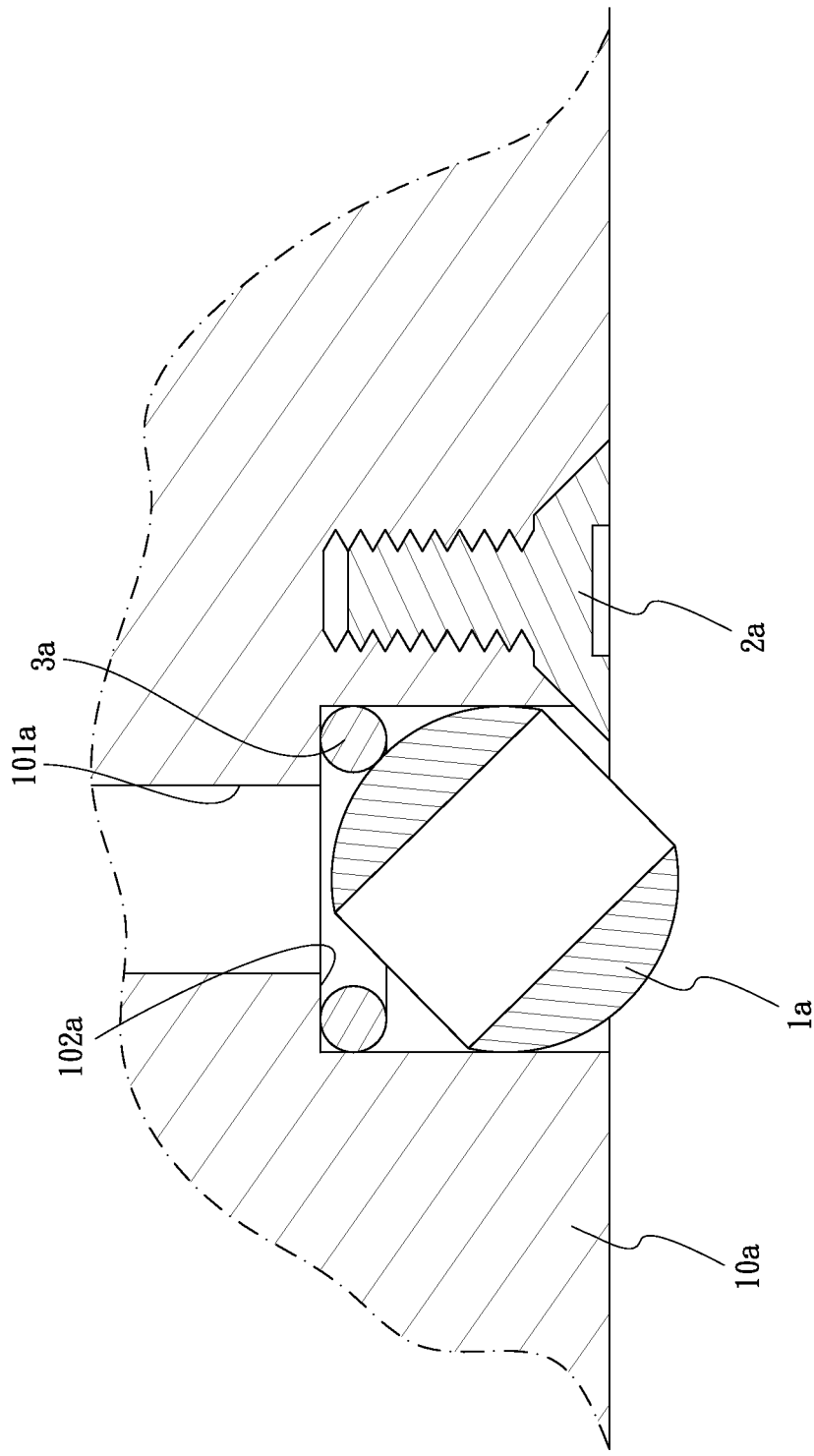

Referring to FIG. 10, there is shown a third embodiment of the present invention. The third embodiment is similar to the first embodiment, except that a screw member 6 is configured to screwed into the through hole 71 of the ball 7. The ball 7 has a thread 72 defined in an inner periphery of the through hole 71 of the ball 7 which corresponds to the screw member 6. The screw member 6 could be screwed into the through hole 71 of the ball 7 via the thread 72, so that the through hole 71 of the ball 7 could be sealed by the screw member 6 so as to prevent ambient substances from getting into the through hole 71.

Although the invention has been explained in relation to its preferred embodiment, it is to be understood that many other possible modifications and variations can be made without departing from the scope of the invention as hereinafter claimed.

What is claimed is:

1. A draining device for a machine tool, which is to be assembled in a drain hole of a base of the machine tool, the draining device comprising:
   a ball having a through hole defined therein;
   an outer shell having a receiving hole defined therethrough, the ball received in the receiving hole of the outer shell;
   a sealing member having a guiding hole defined therethrough, the guiding hole of the sealing member communicating with the through hole of the ball and the receiving hole of the outer shell, the sealing member inserted in the receiving hole of the outer shell and abutting against the ball with one end; and a flat head screw screwed in a lock hole of the base and having a head portion pressing against a top end of the outer shell;

wherein the ball is rotatable relative to the outer shell so as to adjust an angle of the through hole of the ball; and wherein the sealing member has an annular flange defined at one end thereof and the base has a step hole defined at an opening portion of the drain hole, the annular flange of the sealing member abuts against a shoulder portion of a step hole of the base; and one end of the ball is projected from the step hole of the base.

2. The draining device as claimed in claim 1, wherein a diameter of the receiving hole of the outer shell is slightly greater than or equal to a diameter of the ball; the outer shell has an arc surface defined in one end of the receiving hole opposite to the sealing member, the arc surface of the outer shell corresponding to an outer periphery of the ball.

3. The draining device as claimed in claim 1, wherein the sealing member has an arc edge defined at a wall of the guiding hole of the sealing member and corresponding to the outer periphery of the ball.

4. The draining device as claimed in claim 1, further comprising a screw member and a thread defined in an inner periphery of the through hole of the ball; and the screw member is screwed into the through hole of the ball via the thread to seal the through hole.

5. A draining device for a machine tool, which is to be assembled in a drain hole of a base of the machine tool, the draining device comprising:

a ball having a through hole defined therein;

an outer shell having a receiving hole defined therethrough, the ball received in the receiving hole of the outer shell, the outer shell having an external thread defined at an outer periphery thereof and corresponding to an internal thread of the drain hole of the base; and a sealing member has a guiding hole defined therethrough, the sealing member communicating with the through hole of the ball and the receiving hole of the outer shell, the sealing member inserted in the receiving hole of the outer shell and abutting against the ball with one end;

wherein the outer shell is screwed into the drain hole of the base and the ball is rotatable relative to the outer shell so as to adjust an angle of the through hole of the ball; and wherein the sealing member has an annular flange defined at one end thereof and the base has a step hole defined at an opening portion of the drain hole, the annular flange of the sealing member abuts against a shoulder portion of a step hole of the base; and one end of the ball is projected from the step hole of the base.

6. The draining device as claimed in claim 5, wherein a diameter of the receiving hole of the outer shell is slightly greater than or equal to a diameter of the ball; the outer shell has an arc surface defined in one end of the receiving hole opposite to the sealing member, the arc surface of the outer shell corresponding to an outer periphery of the ball.

7. The draining device as claimed in claim 5, wherein the sealing member has an arc edge defined at a wall of the guiding hole of the sealing member and corresponding to the outer periphery of the ball.

8. The draining device as claimed in claim 5, further comprising a screw member and a thread defined in an inner periphery of the through hole of the ball; the screw member is screwed into the through hole of the ball via the thread to seal the through hole.

* * * * *